(12) United States Patent
Shibayama et al.

(10) Patent No.: US 10,061,396 B1
(45) Date of Patent: Aug. 28, 2018

(54) ELECTRONIC APPARATUS

(71) Applicant: LENOVO (SINGAPORE) PTE. LTD., Singapore (SG)

(72) Inventors: Yoshiyuki Shibayama, Yokohama (JP); Hiroyuki Noguchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/722,699

(22) Filed: Oct. 2, 2017

(30) Foreign Application Priority Data

Aug. 9, 2017 (JP) .................... 2017-154371

(51) Int. Cl.
  *G06F 3/02* (2006.01)
  *G06F 1/16* (2006.01)
  *H01H 13/705* (2006.01)

(52) U.S. Cl.
  CPC ............ *G06F 3/021* (2013.01); *G06F 1/1616* (2013.01); *H01H 13/705* (2013.01)

(58) Field of Classification Search
  None
  See application file for complete search history.

(56) References Cited

U.S. PATENT DOCUMENTS

| | | | | |
|---|---|---|---|---|
| 9,714,533 | B2* | 7/2017 | Kuramochi | E05D 3/12 |
| 2001/0033269 | A1* | 10/2001 | Hosoya | G06F 1/1616 |
| | | | | 345/168 |
| 2011/0023272 | A1* | 2/2011 | Huang | E05D 3/18 |
| | | | | 16/362 |

FOREIGN PATENT DOCUMENTS

JP     2016212722 A    12/2016

* cited by examiner

*Primary Examiner* — Duane N Taylor, Jr.
(74) *Attorney, Agent, or Firm* — Shimokaji IP

(57) ABSTRACT

An electronic apparatus having a thinner chassis by pressing keycaps and capable of avoiding an erroneous motion or an erroneous input. An electronic apparatus includes: a key-position setting mechanism configured to interlock with a rotation of a display chassis and a main body chassis via a hinge mechanism to move keycaps from a first position to a second position; and a controller configured to enable a key input signal from the keycaps when the keycaps are at least at the first position and to disable a key input signal from the keycaps when the key-position setting mechanism moves the keycaps to the second position.

8 Claims, 11 Drawing Sheets

ELECTRONIC APPARATUS

FIELD OF THE INVENTION

The present invention relates to an electronic apparatus including a keyboard unit.

BACKGROUND OF THE INVENTION

Electronic apparatuses are available, such as a laptop personal computer (laptop PC) including a display chassis joined with a main body chassis so as to be rotatable relative to the main body chassis from 0 degree to about 180 degrees or so as to flip at 360 degrees beyond the position of 180 degree. Recently the development of such an electronic apparatus having a thinner chassis has progressed rapidly.

Typically the main body chassis of a portable information device of this type comes with a keyboard unit having a plurality of keycaps that are elastically supported to be vertically movable. Such a keyboard unit has to have a certain degree of keystroke for good operability. To this end, a keyboard unit has to have a certain thickness so as to avoid the interference of the display with the keyboard unit at the upper face of the main body chassis when the display chassis is closed to the main body chassis. This is a barrier for a thinner chassis.

The present applicant proposed a configuration capable of pressing each keycap down during closing of the display chassis in Patent Document 1. This configuration can avoid the interference of the display with the keycaps, so that the entire chassis of the electronic apparatus can be thinner.

[Patent Document 1] Japanese Patent No. 5980374

SUMMARY OF THE INVENTION

When the electronic apparatus is configured to press keycaps down while closing the display chassis as in the above Patent Document 1, a key input signal may be erroneously output in response to the pressing-down of the keycaps, which may cause an erroneous motion or an erroneous input.

In view of the above problem of the prior art, the present invention aims to provide an electronic apparatus having a thinner chassis by pressing keycaps down and capable of avoiding an erroneous motion or an erroneous input.

An electronic apparatus according to the first aspect of the present invention includes: a keyboard unit having a plurality of keycaps configured to move upward and downward between a first position where the keycaps move upward due to a biasing force of an elastic member and a second position where the keycaps move downward against the biasing force of the elastic member; a main body chassis in which the keyboard unit is disposed; a display chassis including at least a display; a hinge mechanism configured to join the display chassis rotatably with the main body chassis; a key-position setting mechanism configured to interlock with a rotation of the display chassis and the main body chassis via the hinge mechanism to move the plurality of the keycaps from the first position to the second position; and a controller configured to enable a key input signal from the keycaps when the keycaps are at least at the first position and to disable a key input signal from the keycaps when the key-position setting mechanism moves the keycaps to the second position.

The key-position setting mechanism may include: a link mechanism part configured to interlock with a rotation of the hinge mechanism during a rotation of the display chassis relative to the main body chassis; a position changing mechanism part that intervenes between the link mechanism part and the keycaps and configured to interlock with a motion of the link mechanism part to move the plurality of the keycaps upward and downward; and a sensor disposed at the link mechanism part or at the position changing mechanism part, the sensor being configured to detect a state of the link mechanism part or the position changing mechanism part when the key-position setting mechanism moves the keycaps from the first position to the second position, and output a result of the detection to the controller. The controller may switch invalid and valid of the key input signal based on the result of the detection.

The position changing mechanism part may include: a slide member configured to interlock with a motion of the link mechanism part for sliding; and a pressing member configured to rotate when being pressed by the slide member so as to press the plurality of keycaps down to the second position against the biasing force of the elastic member and hold the keycaps. The sensor may detect a sliding position of the slide member.

The sensor may be an optical sensor which is detectable without contact.

The hinge mechanism may rotatably join the main body chassis and the display chassis from a 0-degree position to at least a 90-degree position, wherein at the 0-degree position, surfaces of the main body chassis and the display chassis are opposed to each other, and at the 90-degree position, the surfaces of the main body chassis and the display chassis are orthogonal to each other. At least at the 90-degree position, the plurality of the keycaps may be at the first position, and at least at the 0-degree position, the plurality of the keycaps may be held at the second position by the key-position setting mechanism, and the controller may switch invalid and valid of the key input signal at a setting angular position between the 0-degree position and the 90-degree position.

The setting angular position when the display chassis is opened from the 0-degree position to the 90-degree position is defined as a first angular position, the setting angular position when the display chassis is closed from the 90-degree position to the 0-degree position is defined as a second angular position, and the second angular position may be a smaller angle than at the first angular position.

The hinge mechanism may rotatably join the main body chassis and the display chassis from a 0-degree position to a 360-degree position via a 180-degree position, wherein at the 0-degree position, surfaces of the body chassis and the display chassis are opposed to each other, at the 180-degree position, the surfaces of the body chassis and the display chassis are directed to a same direction and are parallel to each other, and at the 360-degree position, rear faces of the main body chassis and the display chassis are opposed to each other. At least in a range from the 90-degree position to the 180-degree position, the plurality of keycaps may be at the first position, and at least at the 0-degree position and at the 360-degree position, the plurality of the keycaps may be held at the second position by the key-position setting mechanism, and the controller may switch invalid and valid of the key input signal at a first setting angular position between the 0-degree position and the 180-degree position and at a second setting angular position between the 180-degree position and the 360-degree position.

The first setting angular position when the display chassis is opened from the 0-degree position to the 180-degree position is defined as a first angular position, the first setting angular position when the display chassis is closed from the 180-degree position to the 0-degree position is defined as a second angular position, and the second angular position may be a smaller angle than at the first angular position.

According to the above described aspects of the present invention, the electronic apparatus has a thinner chassis by pressing keycaps and is capable of avoiding an erroneous motion or an erroneous input.

DETAILED DESCRIPTION OF THE INVENTION

Figure 1:
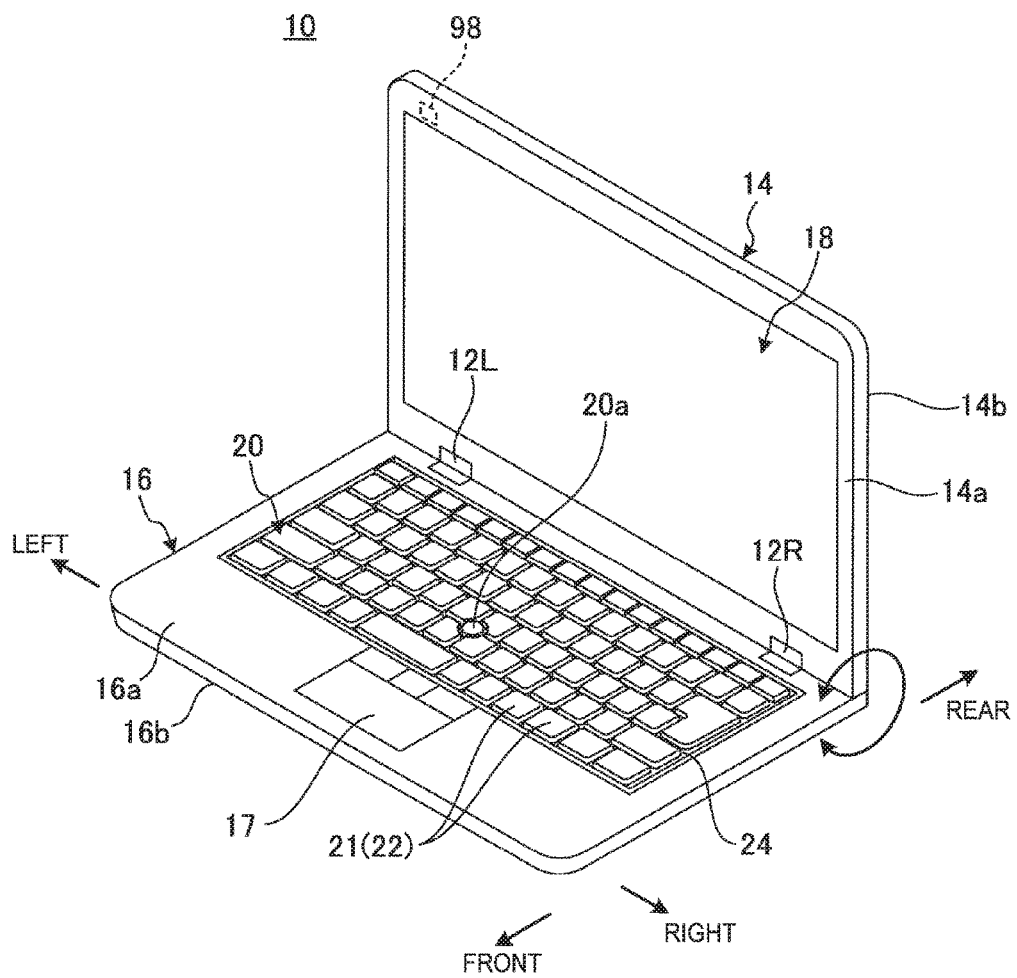
FIG. 1 is a perspective view of an electronic apparatus according to one embodiment of the present invention.

Referring to the drawings, the following describes an electronic apparatus according to the present invention in detail by way of a preferable embodiment.

1. Overall Configuration of Electronic Apparatus

Figure 2:
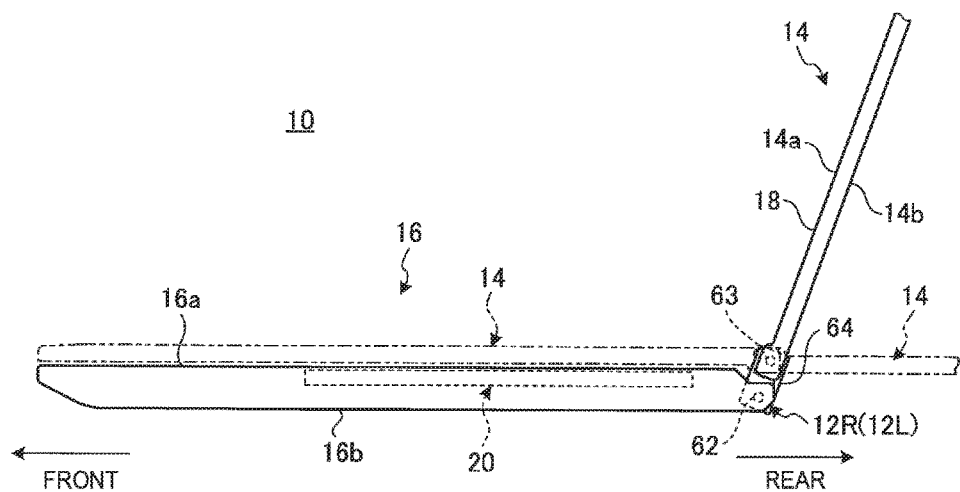
FIG. 2 is a side view of the electronic apparatus shown in FIG. 1.
Figure 3:
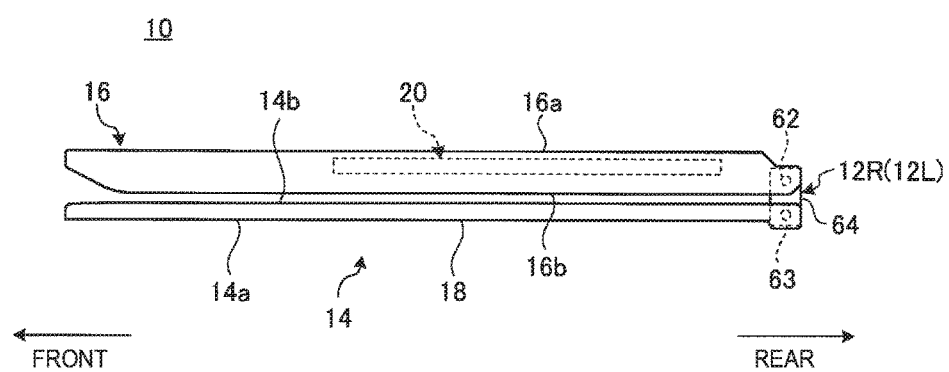
FIG. 3 is a side view of the electronic apparatus during use as a tablet PC, in which the display chassis is rotated in the opening direction from the state of FIG. 2 to be the 360-degree position.

FIG. 1 is a perspective view of an electronic apparatus 10 according to one embodiment of the present invention. FIG. 1 shows the electronic apparatus during use as a laptop PC, in which a display chassis 14 is opened from a main body chassis 16 via hinge mechanisms 12L, 12R. FIG. 2 is a side view of the electronic apparatus 10 shown in FIG. 1. FIG. 3 is a side view of the electronic apparatus during use as a tablet PC, in which the display chassis 14 is rotated in the opening direction from the state of FIG. 2 to be the 360-degree position.

The electronic apparatus 10 according to the present embodiment is a convertible PC that can be used as a laptop PC and as a tablet PC. When the display chassis 14 is rotated at an angle of 90 degrees to 180 degrees relative to the main body chassis 16, the electronic apparatus 10 is in the laptop mode that can be preferably used as a laptop PC (see FIG. 1 and FIG. 2). When the display chassis 14 is rotated at an angle of 360 degrees relative to the main body chassis 16, the electronic apparatus 10 is in the tablet mode that can be preferably used as a tablet PC (see FIG. 3). The electronic apparatus 10 may be of various types of electronic apparatuses other than such a convertible type PC, including a mobile phone, a smartphone, and an electronic organizer.

In the following description, based on the laptop mode shown in FIG. 1 and FIG. 2, the direction toward the user using the keyboard unit 20 while viewing a display 18 is front, the direction away from the user is rear, the thickness direction of the main body chassis 16 is up and down, and the width direction is left and right.

Angular positions of the display chassis 14 relative to the main body chassis 16 are as follows. When the display chassis 14 is completely closed to the main body chassis 16 so that their mutual surfaces 14a, 16a, i.e., the display 18 and the keyboard unit 20 are opposed, this position is the 0-degree position (see the display chassis 14 shown with the dashed-two dotted line on one side in FIG. 2). Based on this 0-degree position, the angular positions are changed as follows corresponding to the angles of the display chassis 14 rotating in the opening direction. For instance, when the surfaces 14a, 16a of the display chassis 14 and the main body chassis 16 are orthogonal to each other, the angular position is a 90-degree position. When the surfaces 14a, 16a are directed in the same direction (upward) and are parallel to each other (see the display chassis 14 shown with the dashed-two dotted line on the other side in FIG. 2), the angular position is a 180-degree position. When the rear faces 14b, 16b of the display chassis 14 and the body chassis 16 are opposed, the angular position is a 360-degree position (see FIG. 3) These 0-degree position, 180-degree position, 360-degree position and the like may include angular positions shifted from their accurate angular positions indicated with the numerical angles to some extent due to the configurations of the main body chassis 16, the display chassis 14, or the hinge mechanisms 12L, 12R.

As shown in FIG. 1 to FIG. 3, the electronic apparatus 10 includes the display chassis 14 having the display 18 and the main body chassis 16 having the keyboard unit 20. The display chassis 14 and the main body chassis 16 are joined via a pair of left and right hinge mechanisms 12L, 12R (hereinafter they may be called "hinge mechanism 12" collectively) so as to be rotatable from the 0-degree position to the 360-degree position.

The display chassis 14 is electrically connected to the main body chassis 16 via a cable (not illustrated) passing through the hinge mechanism 12. The display 18 includes a touch-panel type liquid crystal display, for example.

The main body chassis 16 has a flat box shape, at a rear edge of which the hinge mechanism 12 is disposed. The main body chassis 16 accommodates various types of electronic components not illustrated, such as a board, an arithmetic unit and a memory. The keyboard unit 20 is disposed at the surface 16*a* of the main body chassis 16. The keyboard unit 20 includes a pointing stick 20*a* at a substantially center thereof. The pointing stick 20*a* is to manipulate a cursor (mouse pointer) displayed on the display 18, and is an input means as an alternative of a mouse. The keyboard unit 20 includes a touch pad 17 at a front. The touch pad 17 is to manipulate a cursor (mouse pointer) displayed on the display 18. Three functional buttons are disposed at the rear of the touch pad 17. These functional buttons operate in association with the manipulation of the cursor by the pointing stick 20*a* or the touch pad 17.

The keyboard unit 20 includes a plurality of key switches 21 arranged in the front/rear and left/right directions, and a frame 24 to fill gaps between keycaps 22 that are operating surfaces of the key switches 21. In the present embodiment, the keyboard unit 20 has an isolated structure, in which neighboring keycaps 22 are separated by the frame 24 and so each keycap is independent. The frame 24 is a frame-shaped plate having a plurality of holes 24*a* (see FIG. 5A and FIG. 5B) through which the keycaps 22 of the key switches 21 pass. The frame 24 is attached to be substantially flush with or slightly lower than the surface 16*a* of the main body chassis 16.

The main body chassis 16 includes a key-position setting mechanism 26. The key-position setting mechanism is to move the keycaps 22 to a non-use position (second position) that is located down from a use-position (first position) for the normal operation at least at the 0-degree position and the 360-degree position, and to hold the keycaps at the position (see FIG. 5A and FIG. 5B). This allows the electronic apparatus 10 to be thin so that the keycaps 22 do not protrude from the surface 16*a* of the main body chassis 16 at the 0-degree position and the 360-degree position. The up-and-down motion of the keycaps 22 by the key-position setting mechanism 26 interlocks with the rotation of the display chassis 14 by the hinge mechanism 12.

2. Keyboard Unit 2.1. Configuration of Keyboard Unit

The following describes a specific example of the configuration of the keyboard unit 20.

Figure 4:
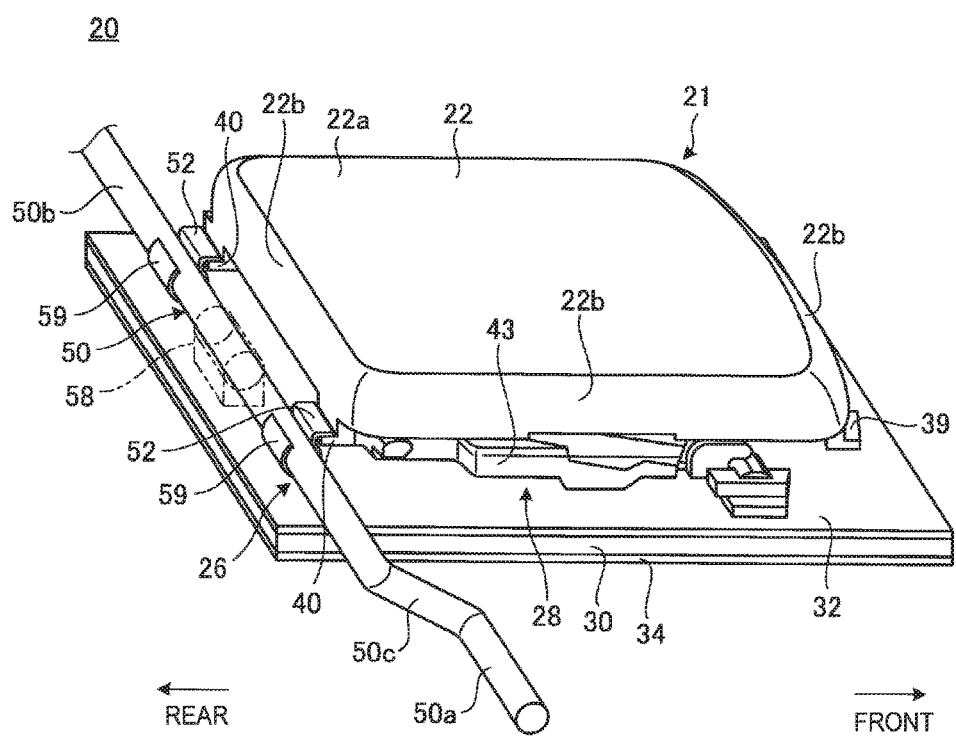
FIG. 4 is an enlarged perspective view of a key switch and its peripheral of the keyboard unit.
Figure 5A:
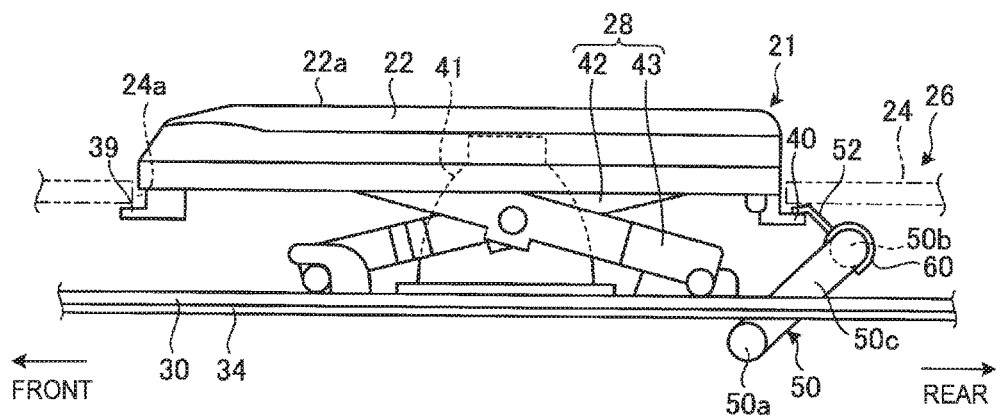
FIG. 5A is a side view of the key switch when the keycap is at the uppermost use-position.
Figure 5B:
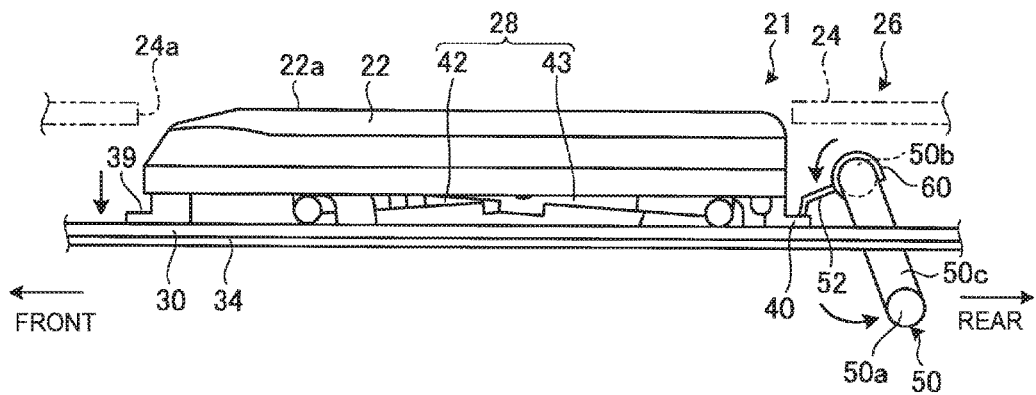
FIG. 5B is a side view of the key switch when the keycap is pushed down by the key-position setting mechanism from the state of FIG. 5A and is at the lowermost non-use position.

FIG. 4 is an enlarged perspective view of a key switch 21 and its peripheral of the keyboard unit 20. FIG. 5A is a side view of the key switch when the keycap 22 is at the uppermost use-position. FIG. 5B is a side view of the key switch when the keycap 22 is pressed down by the key-position setting mechanism 26 from the state of FIG. 5A and is at the lowermost non-use position.

As shown in FIG. 4, FIG. 5A and FIG. 5B, the keyboard unit 20 includes the key switch 21 having the keycap 22 supported movable up and down by a guide mechanism 28, and a base plate 30 having an upper face to support the key switch 21. On the upper face of the base plate 30, a membrane sheet 32 is disposed. On the lower face of the base plate 30, a waterproof sheet 34 is attached. FIG. 5A and FIG. 5B omit the membrane sheet 32.

The base plate 30 is formed by cutting and raising or punching a thin metal plate made of aluminum or the like. The base plate 30 is to mount the key switches 21. All of the key switches 21 are mounted on one base plate 30. The frame 24 is placed above the upper face of the base plate 30.

The membrane sheet 32 is disposed on the base plate 30. The membrane sheet 32 is a three-layered switch sheet to close a contact when being pressed, for example. The membrane sheet 32 includes a fixed contact and a movable contact at an overlapped position. When the position is pressed to bring the movable contact into a close contact with the fixed contact, the contacts are closed. The membrane sheet 32 has through holes at appropriate positions, and the guide mechanism 28 comes in contact with the upper face of the base plate 30 through the corresponding through hole. The membrane sheet 32 may be disposed under the base plate 30.

The keycap 22 is disposed above the base plate 30 via the guide mechanism 28. The keycap 22 is a manipulating member to input a signal. The keycap 22 is formed by molding of resin, for example, to have a substantially square shape in plan view. The keycap 22 has an upper face 22*a* as a surface for manipulation, and lateral faces 22*b* extending downward from the four edges of the upper face 22*a*. The front lateral face 22*b* has a pair of right and left protruding pieces 39, 39 that protrude forward. The rear lateral face 22*b* has a pair of right and left receiving pieces 40, 40 that protrude rearward. The keycap 22 has an inner space surrounded with the upper face 22*a* and the lateral faces 22*b*, and the inner space is to place the guide mechanism 28 and a rubber dome 41 (see FIG. 5A). FIG. 5B omits the rubber dome 41.

Each protruding piece 39 is a wing-like member having a substantially rectangular shape in plan view and protrudes outward from the lateral face 22*b*. The protruding piece 39 functions as a stopper that comes in contact with the top face of the frame 24 to prevent the keycap 22 from coming off upward. Each protruding piece 39 also has a function to define the maximum height position of the keycap 22 in the upward moving direction.

Each receiving piece 40 is a wring-like member having a substantially rectangular shape in plan view and projects outward from the lateral face 22*b*. The receiving piece 40 is a part to receive a force of the key-position setting mechanism 26 to press the keycap 22 downward. Together with the protruding piece 39, each receiving piece 40 functions as a stopper to prevent the keycap 22 from coming off upward and to define the maximum height position of the keycap 22 in the upward moving direction.

The rubber dome 41 is an elastic member to press the membrane sheet 32 when the keycap 22 is pressed down, and to return the keycap 22 to the original position when the pressing force of the keycap 22 is released. The rubber dome 41 is disposed between the membrane sheet 32 and the keycap 22. The keycap 22 is elastically supported by the rubber dome 41 while being guided by the guide mechanism 28 to be movable up and down. The rubber dome 41 is made of an elastic material having flexibility such as silicon rubber. The elastic member to elastically support the keycap 22 to be movable up and down may be a spring, for example, other than the rubber dome.

When the keycap 22 is pressed down, the rubber dome 41 is elastically deformed by the pressing force in the key switch 21 and the membrane sheet 32 is pressed, so that the membrane sheet 32 will close the contacts. When the pressing force of the keycap 22 is released, the keycap 22 returns to the original position (use position) by the elastic restoring force of the rubber dome 41, so that the membrane sheet 32 will open the contacts.

The guide mechanism 28 is to support the keycap 22 to be movable up and down. The guide mechanism is attached foldably between the base plate 30 and the keycap 22. The guide mechanism 28 of this disclosure has a pantograph structure having an inside frame 42 and an outside frame 43 that are attached like a brace.

2.2 Configuration of Key-Position Setting Mechanism

Figure 6:
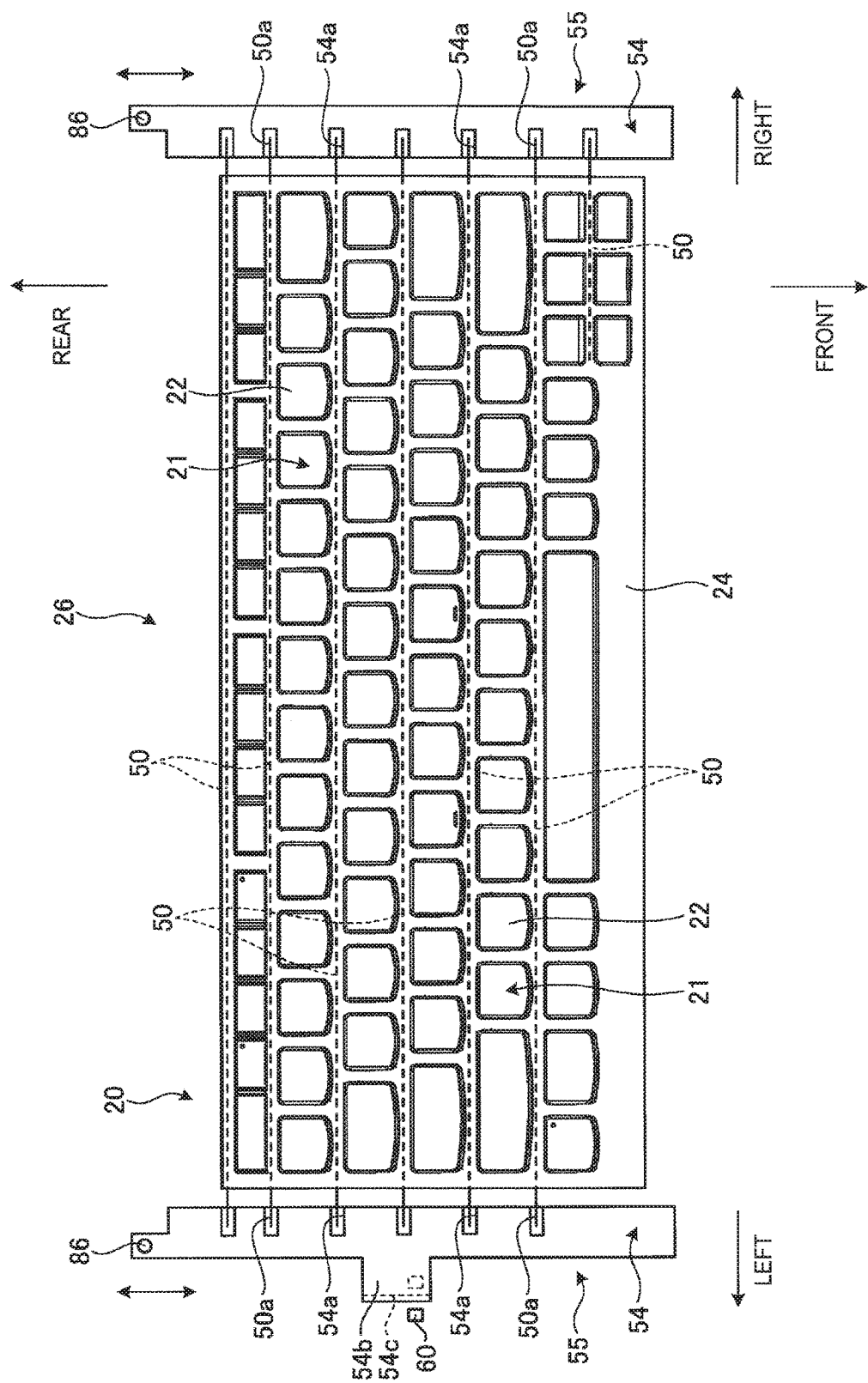
FIG. 6 is a plan view schematically showing the configuration of the key-position setting mechanism.

The following describes an example of the configuration of the key-position setting mechanism 26 to hold the keycap 22 of each key switch 21 at the non-use position. FIG. 6 is a plan view schematically showing the configuration of the key-position setting mechanism 26. The key-position setting mechanism 26 includes a position changing mechanism part 55 having a rotating shaft member 50, a pressing piece 52, a front/rear slider 54, and a link mechanism part 56 (see FIG. 11A and FIG. 11B) to move the position changing mechanism part 55.

As shown in FIG. 4 to FIG. 6, a plurality of rotating shaft members 50 extend along the rear lateral parts of the keycaps 22 arranged in the left/right direction of the keyboard unit 20 and are arranged in the front/rear direction of the keyboard unit 20. Each rotating shaft member 50 is hard wire made of SUS, for example, and has a diameter of about 1 mm and has sufficient stiffness.

Each rotating shaft member 50 is below the frame 24 of the keyboard unit 20, and extends in the left/right direction of the keyboard unit 20. Each rotating shaft member 50 has a driving end 50a at each of left and right ends. These driving ends protrude from the left and right lateral ends of the frame 24. Each driving end 50a engages with a slit 54a of the front/rear slider 54 that is disposed close to each of the left and right lateral parts of the keyboard unit 20.

As shown in FIG. 4, FIG. 5A and FIG. 5B, the rotating shaft member 50 includes a linear base 50b that extends along the rear lateral parts of the keycaps 22 in the left/right direction and the driving ends 50a at both ends of the base 50b. The base 50b has an arm 50c formed by bending each end of the base by 90 degrees. Then, the driving end 50a is formed by bending the arm 50c by 90 degrees from the leading end, so that the driving end protrudes in the left/right direction to be parallel to the base 50b. As a result, each end of the rotating shaft member 50 has a crank shape.

The base 50b is positioned and supported rotatably by a bearing 58 (see FIG. 4) on the base plate 30 or the frame 24 at an appropriate part in the left/right direction. This allows, when the left and right front/rear sliders 54 slide in the front/rear direction, the driving ends 50a to move in the front/rear direction together with the front/rear sliders 54 while rotating in the corresponding slits 54a of the front/rear sliders 54. As a result, the arm 50c swings like a pendulum in the forward/rearward direction around the base 50b supported by the bearing 58, and the base 50b rotates around the axis (see FIG. 5A and FIG. 5B).

The pressing piece 52 is formed by bending a mounting tube 59 externally fitted and fixed to the outer circumferential surface of the base 50b of each rotating shaft member 50 so as to protrude from the outer circumferential surface of the base 50b toward the keycap 22. The mounting tube 59 is fixed to the base 50b by caulking fixation or spot welding. The pressing piece 52 is a plate piece protruding from the outer circumferential surface of the mounting tube 59. The pressing piece 52 is disposed so as to come in contact with the upper face of the receiving piece 40 of each keycap 22, and can press the receiving piece 40 downward.

The front/rear slider (slide member) 54 is a long rectangular plate member, and is provided slidably in the front/rear direction relative to the main body chassis 16. A pair of such front/rear sliders 54 is provided on the left and right of the keyboard unit 20. The front/rear slider 54 is a member to receive the driving force from the link mechanism part 56 described later, and interlocks with the motion of the link mechanism part 56 to slide in the front/rear direction.

Figure 7A:
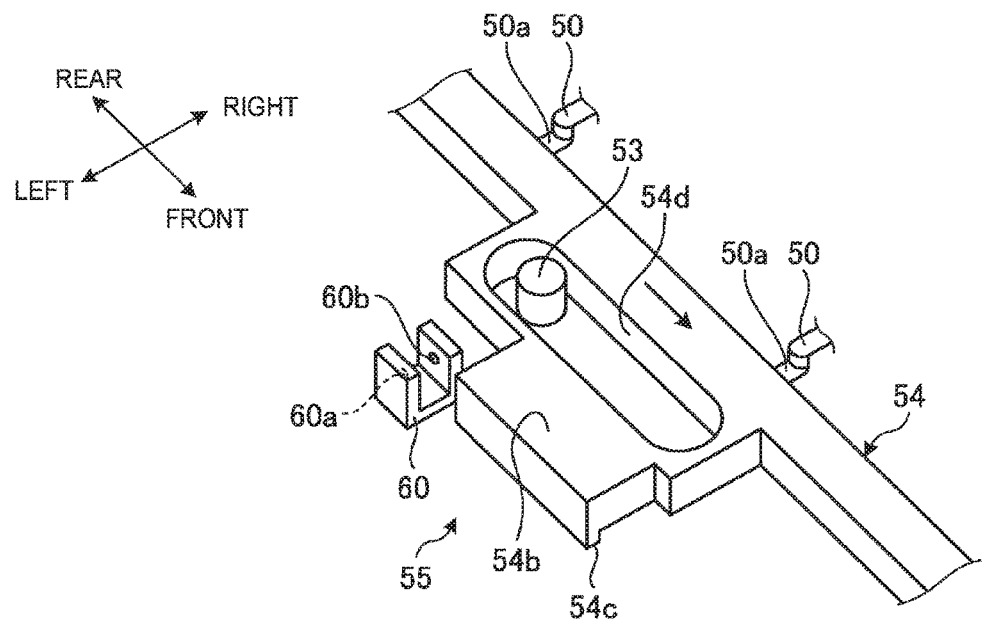
FIG. 7A is an enlarged perspective view of a part of the front/rear slider when the keycap is at the use position.
Figure 7B:
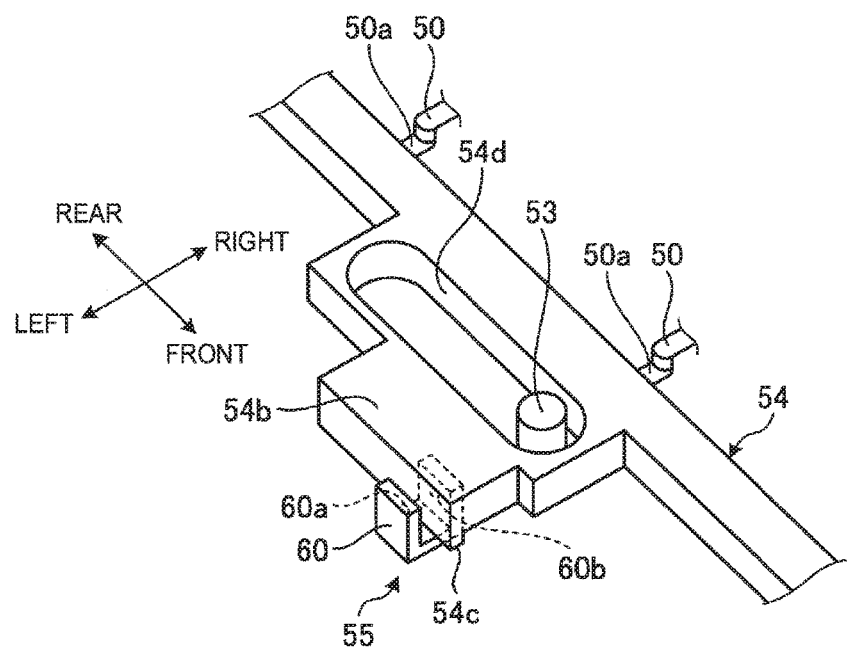
FIG. 7B is an enlarged perspective view of a part of the front/rear slider when the keycap is at the non-use position.
Figure 8:
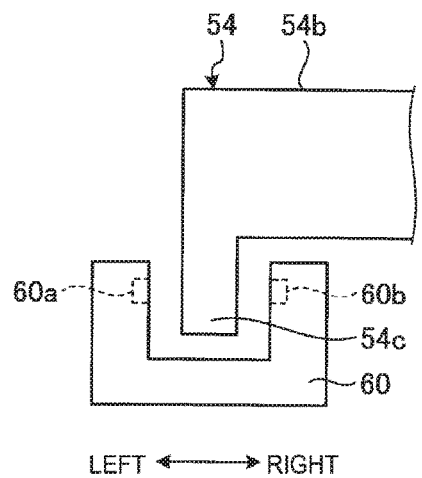
FIG. 8 is a front view of a part of the front/rear slider viewed from the front.

FIG. 7A is an enlarged perspective view of a part of the front/rear slider 54 when the keycap 22 is at the use position. FIG. 7B is an enlarged perspective view of a part of the front/rear slider 54 when the keycap 22 is at the non-use position. FIG. 8 is a front view of a part of the front/rear slider 54 viewed from the front.

As shown in FIG. 6 to FIG. 7B, the front/rear slider 54 on one side (e.g., on the left) has a protrusion 54b. The protrusion 54b is a plate-like part that laterally protrudes from the front/rear slider 54. The protrusion 54b includes a detection piece 54c on the lower face at the end (see FIG. 8). The detection piece 54c protrudes from the lower face of the protrusion 54b and extends along the end of the lower face in the front/rear direction. Reference numeral 54d in FIG. 7A and FIG. 7B denotes a guide hole formed in the front/rear slider 54 in the front/rear direction. Reference numeral 53 denotes a guide pin to guide the sliding of the front/rear slider 54. The guide pin protrudes from the inner face of the main body chassis 16 and is inserted slidably into the guide hole 54d.

A sensor 60 is disposed close to a lateral part of the front/rear slider 54. The sensor 60 has a U-letter shape so as to cover the detection piece 54c from the below (see FIG. 8). The sensor 60 is a non-contact type optical sensor. The sensor includes left and right upright plate pieces that are opposed to each other, and a light-emitting part 60a and a light-receiving part 60b on the inner faces of these left and right plate pieces.

When the keycap 22 is at the use position shown in FIG. 5A, the left and right front/rear sliders 54 of the position changing mechanism part 55 is at the frontmost slid position. In this state, the detection piece 54c of the front/rear slider 54 is at a position not blocking the light between the light-emitting part 60a and the light-receiving part 60b of the sensor 60 as shown in FIG. 7A, so that the sensor 60 outputs an ON signal.

When the front/rear sliders 54 slide rearward from this state, the driving end 50a accordingly moves rearward and the base 50b rotates around the axis. Thereby, the pressing piece 52 protruding from the outer circumferential surface of the base 50b swings downward so as to press the receiving piece 40 of the keycap 22 down, and press down the keycap 22 forcibly. As a result, the keycap 22 is held at the non-use position shown in FIG. 5B. In this way, the rotating shaft member 50 and the pressing piece 52 function as a pressing-down member that is pressed by the front/rear slider 54 to rotate, and presses the keycaps 22 down to their non-use position and holds the position. At this non-use position, the upper face 22a of the keycap 22 is flush with or slightly lower than the upper face of the frame 24, so that the upper face of the keyboard unit 20 is like a flat surface without unevenness.

When the front/rear sliders 54 slide rearward to a predetermined position such that the detection piece 54c intervenes between the light-emitting part 60a and the light-receiving part 60b, then the sensor 60 outputs an OFF signal (invalid signal). As shown in FIG. 7B, the OFF signal of the sensor 60 is kept until the front/rear sliders 54 slide to the rearmost position.

On the other hand, when the keycap 22 is at the non-use position shown in FIG. 5B, the left and right front/rear sliders 54 are at the rearmost slid position. When the front/rear sliders 54 slide forward from this state, the driving ends 50a accordingly move forward and the bases 50b rotate around their axes in the opposite direction from the pressing motion. Thereby, the pressing piece 52 swings upward, so that the pressing force on the receiving piece 40 is released.

As a result, the keycap 22 moves upward due to the biasing force of the rubber dome 41, and so returns to the use position shown in FIG. 5A.

When the front/rear sliders 54 slide forward to a predetermined position such that the detection piece 54c comes out of between the light-emitting part 60a and the light-receiving part 60b, then the sensor 60 outputs an ON signal (valid signal). As shown in FIG. 7A, the ON signal of the sensor 60 is kept until the front/rear sliders 54 slide to the frontmost position.

Such an up/down motion of the keycaps 22 by the key-position setting mechanism 26 links with the hinge mechanism 12 via the link mechanism part 56, and corresponds to the rotation angular positions of the display chassis 14.

3. Rotation of Display Chassis and Interlocking Structure of Keycaps

The following describes an example of the configuration of the hinge mechanism 12 and the link mechanism part 56 to achieve the interlocking between the rotation of the display chassis 14 and the up/down motion of the keycaps 22 by the key-position setting mechanism 26.

3.1 Configuration of Hinge Mechanism

The following describes an example of the configuration of the hinge mechanism 12.

Figure 9:
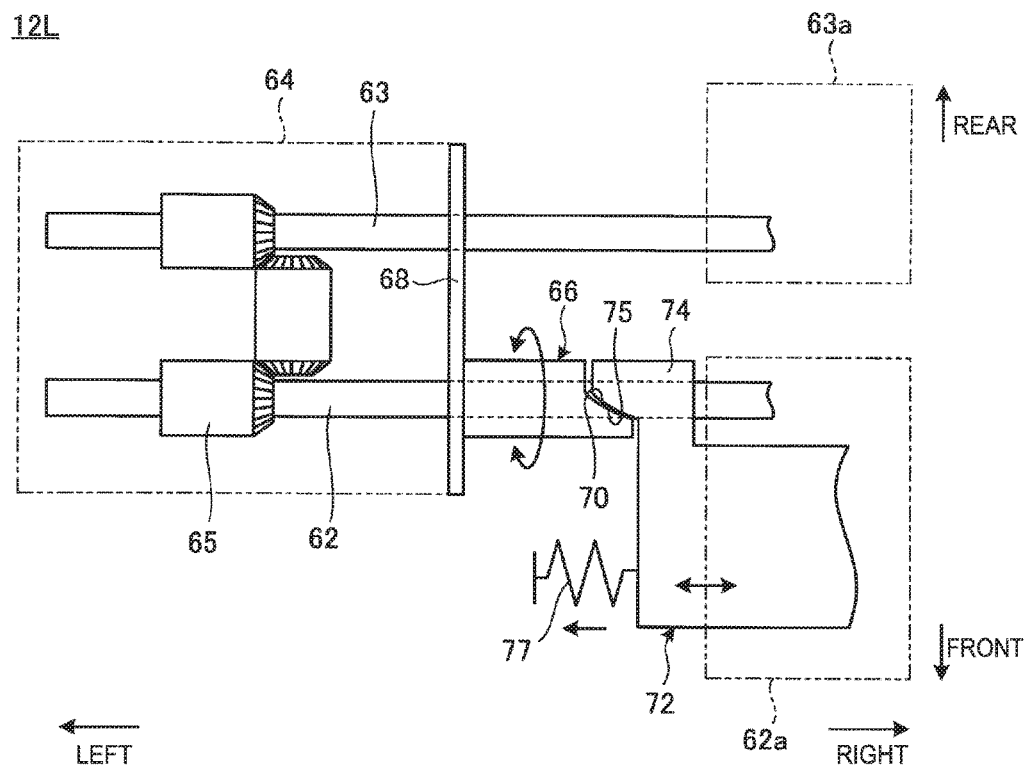
FIG. 9 is a plan view schematically showing an example of the configuration of the hinge mechanism.

FIG. 9 is a plan view schematically showing an example of the configuration of the hinge mechanism 12. FIG. 9 shows the configuration of the hinge mechanism 12L on the left. The following describes the hinge mechanism 12L on the left as a representative example of the hinge mechanism 12. Note here that the hinge mechanism 12R has the same configuration as that of the hinge mechanism 12L on the left other than that they are bilaterally symmetrical, and so the detailed description on the hinge mechanism 12L is omitted.

As shown in FIG. 9, the hinge mechanism 12 includes a first shaft 62 extending in the left/right direction, a second shaft 63 parallel to the first shaft 62, and a box-like hinge chassis 64 to rotatably support and house the first shaft 62 and the second shaft 63 (see FIG. 2 and FIG. 3 as well).

The first shaft 62 has one end fixed to a mounting plate 62a, and the mounting plate 62a is fixed to the main body chassis 16, whereby the first shaft rotates integrally with the main body chassis 16. The second shaft 63 has one end fixed to a mounting plate 63a, and the mounting plate 63a is fixed to the display chassis 14, whereby the second shaft rotates integrally with the display chassis 14. The other ends of the first shaft 62 and the second shaft 63 are supported rotatably in the hinge chassis 64. In the case of this disclosure, the first shaft 62 and the second shaft 63 rotate in synchronization via a train of gears 65.

The first shaft 62 has the outer circumferential surface, and at a part of the outer circumferential surface outside of the hinge chassis 64, a tubular cam member 66 is disposed coaxially with the first shaft. The tubular cam member 66 is externally inserted on the outer circumferential surface of the first shaft 62 so as to be rotatable relative to the first shaft 62. The tubular cam member 66 is integral with a supporting plate 68, and the supporting plate 68 is fixed to one lateral part of the hinge chassis 64. The supporting plate 68 is integral with the hinge chassis 64, and has holes through which the first shaft 62 and the second shaft 63 pass rotatably. When the first shaft 62 and the hinge chassis 64 rotate mutually, the tubular cam member 66 rotates integrally with the hinge chassis 64 and relatively to the first shaft 62. The tubular cam member 66 has one end (the right in FIG. 9) having a cam surface 70 having an axial position that changes along the circumferential direction.

On the outer circumferential surface of the first shaft 62 at a part close to the tubular cam member 66, a tubular joining part 74 of a left/right slider 72 is disposed coaxially with the first shaft. The left/right slider 72 is pressed by the tubular cam member 66 that rotates on the outer circumferential surface of the first shaft 62 to slide to the left and the right. The left/right slider 72 is supported slidably to the left and the right in the main body chassis 16. The left/right slider 72 is always biased by a coil spring 77 so that the tubular joining part 74 moves toward the tubular cam member 66. The left/right slider 72 slides to the left and right so as to slide the front/rear slider 54 in the front/rear direction, and the details are described later.

The tubular joining part 74 is disposed close to the one end (the right in FIG. 9) of the tubular cam member 66. The tubular joining part 74 is externally inserted on the outer circumferential surface of the first shaft 62 so as not to rotate relative to the first shaft 62 and so as to move axially. The tubular joining part 74 has an end face opposed to the cam surface 70 of the tubular cam member 66, and the end face is a pressure-receiving face 75. The pressure-receiving face 75 has an axial position that changes along the circumferential direction, and may slidably come in contact with the cam surface 70 that rotates on the outer circumferential surface of the first shaft 62. The cam surface 70 and the pressure-receiving face 75 have to rotate coaxially and slidably come in contact with each other smoothly. To this end, the cam surface 70 and the pressure-receiving face 75 of this disclosure have a twisted shape that tilts in the rotation direction while having a mutually sliding contact.

3.2 Motion of Hinge Mechanism

The following describes the motion of the hinge mechanism 12.

Figure 10A:
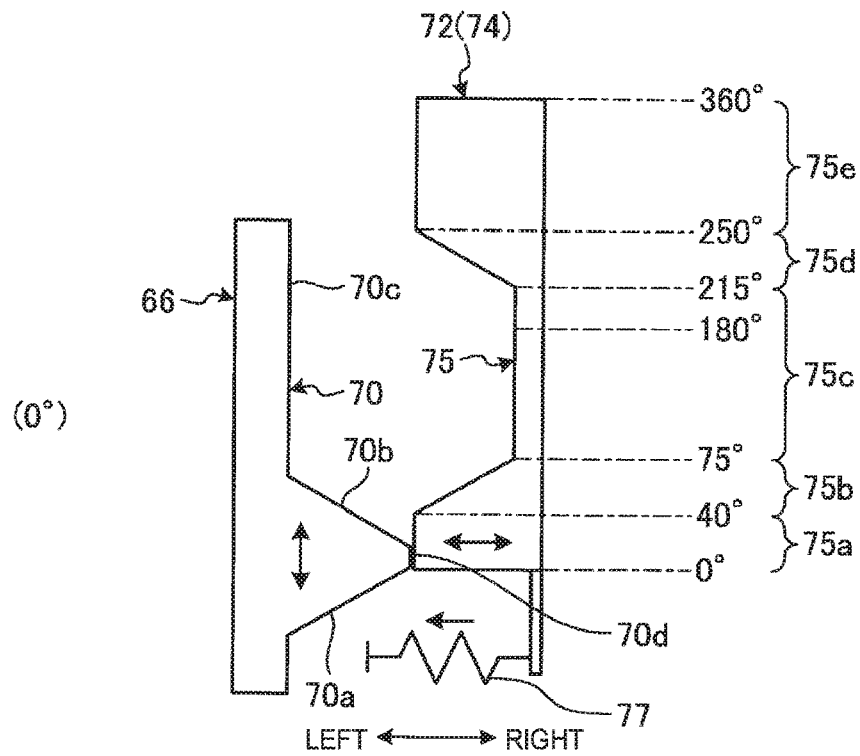
FIG. 10A is a developed view schematically showing the tubular cam member and the tubular joining part of the left/right slider at the 0-degree position that are developed in the circumferential direction.
Figure 10B:
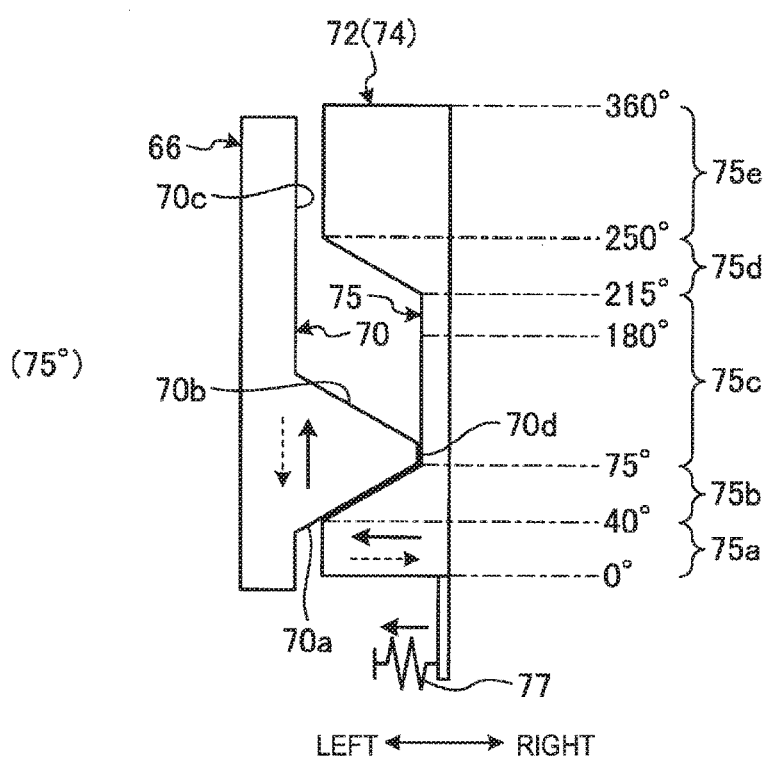
FIG. 10B is a developed view schematically showing the tubular cam member and the tubular joining part of the left/right slider at the 75-degree position that are developed in the circumferential direction.

FIG. 10A and FIG. 10B are developed views schematically showing the tubular cam member 66 and the tubular joining part 74 of the left/right slider 72 that are developed in the circumferential direction. FIG. 10A and FIG. 10B show the positional relationships between the tubular cam member 66 and the tubular joining part 74 at the 0-degree position and at the 75-degree position, respectively.

As shown in FIG. 10A and FIG. 10B, the cam surface 70 of the tubular cam member 66 has a first working part 70a and a second working part 70b defining a protruding portion that axially (to the left and right) changes like a spiral along the circumferential direction, and a non-working part 70c along the circumferential direction. The first working part 70a is an inclined face from the left to the right in FIG. 10A. The second working part 70b is an inclined face from the right to the left in FIG. 10A. The non-working part 70c is a face that does not change to the left and right and is along the circumferential direction.

The cam surface 70 and the pressure-receiving face 75 of the tubular joining part 74 are opposed so as to be in slidable contact. The pressure-receiving face 75 has a first non-working part 75a along the circumferential direction, a first pressure-receiving part 75b, a second non-working part 75c and a second pressure-receiving part 75d defining a trapezoidal recessed portion that axially (to the left and right) changes like a spiral along the circumferential direction, and a third non-working part 75e along the circumferential direction. The first pressure-receiving part 75b is an inclined face from the left to the right in FIG. 10A. The second pressure-receiving part 75d is an inclined face from the right to the left in FIG. 10A. All of the first non-working part 75a, the second non-working part 75c and the third non-working part 75e are faces that do not change to the left and right and are along the circumferential direction.

Between the 0-degree position and the 40-degree position, the top part 70d between the first working part 70a and the second working part 70b of the cam surface 70 comes slidably in contact with the first non-working part 75a of the pressure-receiving face 75 (see FIG. 10A). Between the 40-degree position and the 75-degree position, the first working part 70a comes slidably in contact with the first pressure-receiving part 75b (see FIG. 10B). Between the 75-degree position and the 215-degree position, the top part 70d of the cam surface 70 comes slidably in contact with the second non-working part 75c of the pressure-receiving face 75. Between the 215-degree position and the 250-degree position, the second working part 70b comes slidably in contact with the second pressure-receiving part 75d. Between the 250-degree position and the 360-degree position, the top part 70d of the cam surface 70 comes slidably in contact with the third non-working part 75e of the pressure-receiving face 75. The relationship between the angular positions such as the 40-degree position and the shape of the pressure-receiving face 75 shown in FIG. 10A and FIG. 10B is just one example.

Firstly the following describes the opening motion of the display chassis 14 from the main body chassis 16 via the hinge mechanism 12. The solid arrow in FIG. 10B shows the motion of the tubular cam member 66 and the left/right slider 72 when the display chassis 14 is opened from the 0-degree position to the 360-degree position (the same applies to FIG. 11B). In this case, the tubular cam member 66 rotating integrally with the rotating hinge chassis 64 rotates relative to the first shaft 62 and the pressure-receiving face 75 of the left/right slider 72. The pressure-receiving face 75 does not rotate relative to the first shaft.

As a result, between the 0-degree position and the 40-degree position, the top part 70d of the cam surface 70 of the tubular cam member 66 comes slidably in contact with the first non-working part 75a of the pressure-receiving face 75, so that the left/right slider 72 does not change in position to the left and right. Between the 40-degree position and the 75-degree position, the first working part 70a comes slidably in contact with the first pressure-receiving part 75b, so that the left/right slider 72 gradually moves to the left due to the biasing force of the coil spring 77. Between the 75-degree position and the 215-degree position, the top part 70d comes slidably in contact with the second non-working part 75c, so that the left/right slider 72 does not change in position to the left and right. Between the 215-degree position and the 250-degree position, the second working part 70b comes slidably in contact with the second pressure-receiving part 75d, so that the left/right slider 72 moves to the right against the biasing force of the coil spring 77. Between the 250-degree position and the 360-degree position, the top part 70d comes slidably in contact with the third non-working part 75e, so that the left/right slider 72 does not change in position to the left and right.

Next the following describes the closing motion of the display chassis 14 to the main body chassis 16 via the hinge mechanism 12. The dashed arrow in FIG. 10B shows the motion of the tubular cam member 66 and the left/right slider 72 when the display chassis 14 is closed from the 360-degree position to the 0-degree position (the same applies to FIG. 11B). In this case, the tubular cam member 66 rotating integrally with the hinge chassis 64 that rotates in the opposite direction from the opening motion rotates relative to the first shaft 62 and the pressure-receiving face 75 of the left/right slider 72. The pressure-receiving face 75 does not rotate relative to the first shaft.

As a result, between the 360-degree position and the 250-degree position, the top part 70d comes slidably in contact with the third non-working part 75e, so that the left/right slider 72 does not change in position to the left and right. Between the 250-degree position and the 215-degree position, the second working part 70b comes slidably in contact with the second pressure-receiving part 75d, so that the left/right slider 72 gradually moves to the left due to the biasing force of the coil spring 77. Between the 215-degree position and the 75-degree position, the top part 70d comes slidably in contact with the second non-working part 75c, so that the left/right slider 72 does not change in position to the left and right. Between the 75-degree position and the 40-degree position, the first working part 70a comes slidably in contact with the first pressure-receiving part 75b, so that the left/right slider 72 moves to the right against the biasing force of the coil spring 77. Between the 40-degree position and the 0-degree position, the top part 70d comes slidably in contact with the first non-working part 75a, so that the left/right slider 72 does not change in position to the left and right.

3.3 Configuration of Link Mechanism Part

The following describes an example of the configuration of the link mechanism part 56 to achieve the interlocking between the rotation of the display chassis 14 by the hinge mechanism 12 and the up/down motion of the keycaps 22 by the key-position setting mechanism 26.

Figure 11A:
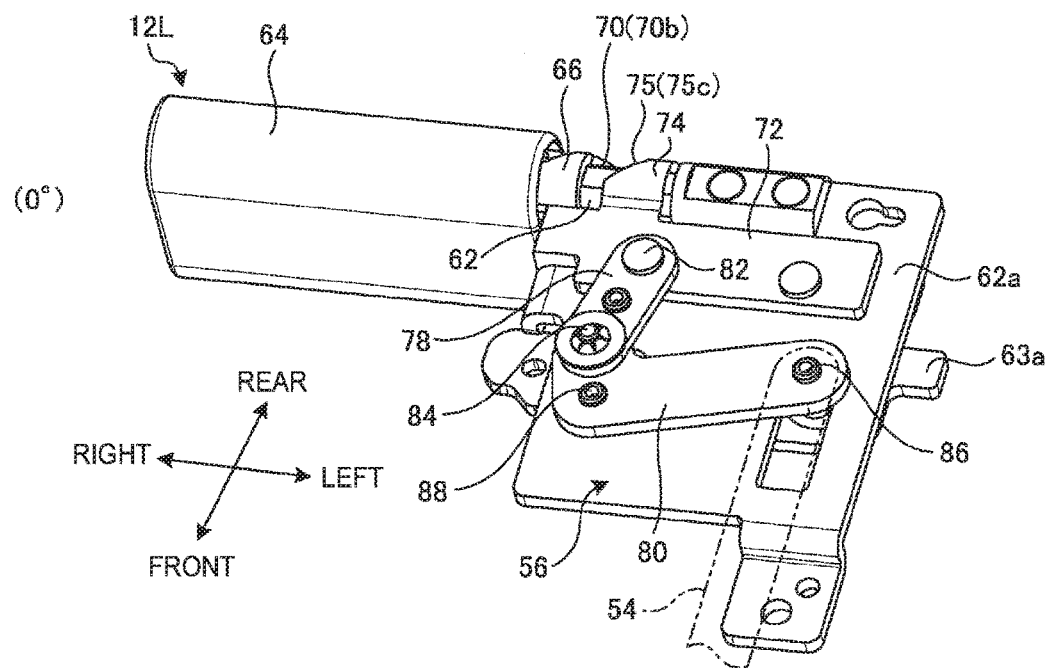
FIG. 11A is a perspective view of the hinge mechanism and the link mechanism part at the 0-degree position viewed from below.
Figure 11B:
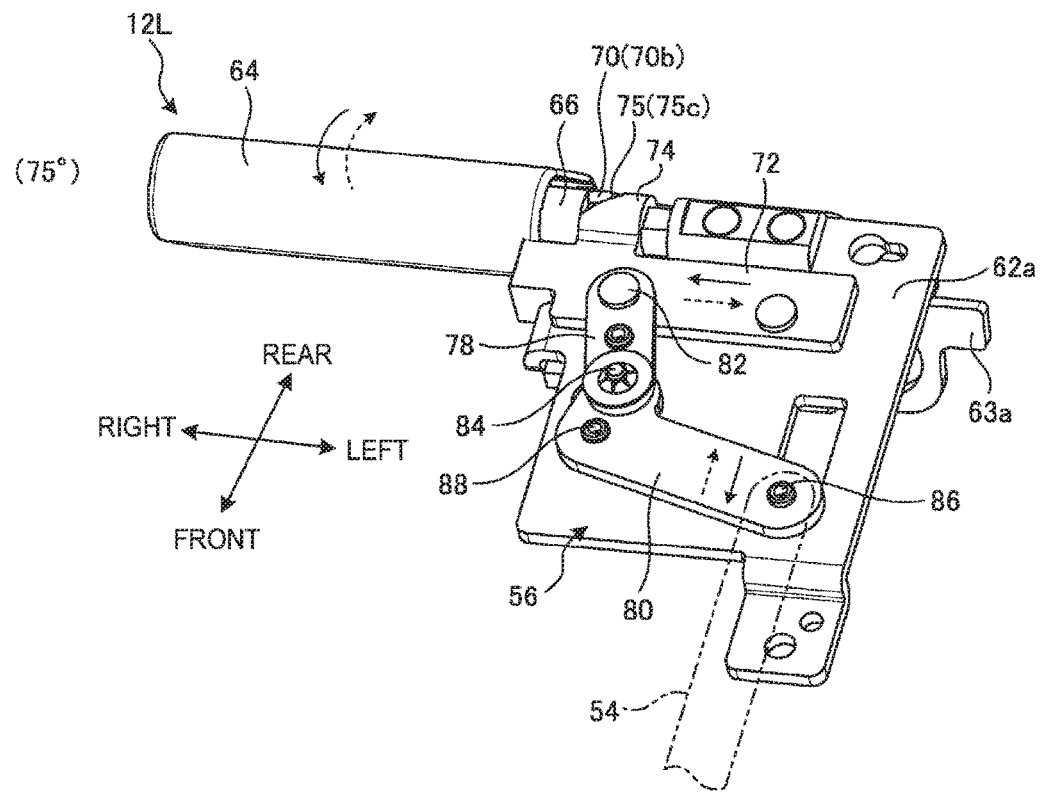
FIG. 11B is a perspective view of the hinge mechanism and the link mechanism part at the 75-degree position viewed from below.

FIG. 11A and FIG. 11B are perspective views of the hinge mechanism 12L and the link mechanism part 56 viewed from the below. FIG. 11A and FIG. 11B show the states at the 0-degree position and at the 75-degree position, respectively.

The link mechanism part 56 acts in the main body chassis 16. As shown in FIG. 11A and FIG. 11B, the link mechanism part 56 includes the left/right slider 72, a first link 78 and a second link 80. In the present embodiment, the link mechanism part 56 acts on the surface of a mounting plate 62a. The mounting plate is to fix the first shaft 62 and the main body chassis 16.

The left/right slider 72 has the tubular joining part 74 as described above. The left/right slider 72 is a plate-like member that slides to the left and the right that is the axial direction of the first shaft 62. The left/right slider slides on the mounting plate 62a due to the pressing force by the tubular cam member 66 and the biasing force of the coil spring 77. In response to the rotation of the display chassis 14, the hinge chassis 64 as well as the tubular cam member 66 rotate. Then, the pressure-receiving face 75 of the tubular joining part 74 comes slidably in contact with the cam surface 70 of the tubular cam member 66, and the left/right slider 72 slides to the left and right.

The first link 78 is a plate-like member that is a thin plate of a rod shape. The first link 78 has one end rotatably joined with the left/right slider 72 via a joining shaft 82. The first link 78 has the other end rotatably joined with the second link 80 via a joining shaft 84.

The second link 80 is a plate-like member having an L-letter shape. The second link 80 has the end of the short side of the L letter rotatably joined with the first link 78 via the joining shaft 84. The second link 80 has the end of the long side of the L letter rotatably joined with the rear end of the front/rear slider 54 via a joining shaft 86. A part of the second link 80 at the corner of the L letter is rotatably supported at the main body chassis 16 (the mounting plate 62a in the present embodiment) via a rotating shaft 88.

In response to the rotation of the display chassis 14 relative to the main body chassis 16, the tubular cam member 66 rotates and the left/right slider 72 slides to the left and right. Then, the first link 78 of the link mechanism part 56 is pulled by the left/right slider 72 via the joining shaft 82. This causes the rotation of the first link 78 around the joining shaft 84. Such rotation of the first link 78 around the joining shaft 84 causes the first link 78 to pull the second link 80 via the joining shaft 84. This causes the rotation of the second link 80 around the rotating shaft 88. As a result, the link mechanism part 56 allows the front/rear slider 54 to slide in the front/rear direction, in which the joining shaft 86 to move in the front/rear direction acts as the working point. That is, the link mechanism part 56 interlocks with the rotation of the hinge mechanism 12 to move the position changing mechanism part 55, thus driving the keycaps 22 at the use position or at the non-use position.

4. Interlocking Motion of Keycap with the Rotation of Display Chassis

The following describes one example of the interlocking motion of the rotation of the display chassis 14 with the up/down motion of the keycaps 22 by the key-position setting mechanism 26, and one example of a method for controlling of the electronic apparatus 10 during this motion.

Figure 12:
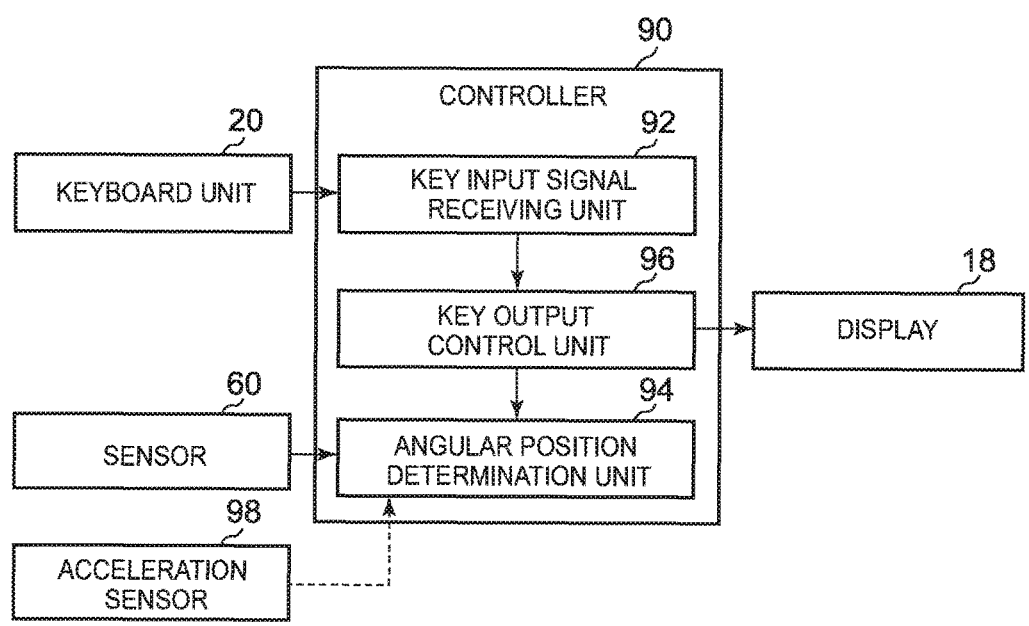
FIG. 12 is a block diagram showing an example of the configuration of a control system of the electronic apparatus.

FIG. 12 is a block diagram showing an example of the configuration of a control system of the electronic apparatus 10.

As shown in FIG. 12, the control system of the electronic apparatus 10 includes a controller 90. The controller 90 includes a key input signal receiving unit 92, an angular position determination unit 94 and a key output control unit 96.

The controller 90 may be implemented through the execution of a program by a processor such as a CPU (Central Processing Unit), i.e., by software, or may be implemented by hardware, such as an IC (Integrated Circuit). The controller may be implemented by software and hardware.

The key input signal receiving unit 92 receives a key input signal corresponding to the key switch 21 of the keyboard unit 20 subjected to an input operation, and the key input signal is output from the membrane sheet 32. The key input signal receiving unit 92 sends this key input signal to the key output control unit 96.

The angular position determination unit 94 receives an ON signal and an OFF signal from the sensor 60 to determine the angular position of the display chassis 14 relative to the main body chassis 16 corresponding to the ON signal and the OFF signal. The angular position determination unit 94 then sends the result of determination to the key output control unit 96. The angular position determination unit 94 may receive an angular signal of the display chassis 14 that is output from an acceleration sensor 98 in addition to or instead of the output from the sensor 60.

The acceleration sensor 98 is disposed at the display chassis 14, for example, to detect the acceleration of the display chassis 14 during the rotation. The acceleration sensor sends the result of detection to the angular position determination unit 94. Receiving the result of detection from the acceleration sensor 98, the angular position determination unit 94 determines the angular position of the display chassis 14 relative to the main body chassis 16 corresponding to the result, or determines whether the display chassis 14 is opening or closing, for example.

Based on the information from the key input signal receiving unit 92 and the angular position determination unit 94, and in response to the input operation of the key switches 21 of the keyboard unit 20, the key output control unit 96 executes input processing of application software being executed or executes displaying processing on the display 18. At this time, when the determination result by the angular position determination unit 94 shows that the keycaps 22 are set at least at the non-use position by the key-position setting mechanism 26, the key output control unit 96 disables the key input signals from the key input signal receiving unit 92. On the contrary, when the determination result by the angular position determination unit 94 shows that the keycaps 22 are set at least at the use position by the key-position setting mechanism 26, the key output control unit 96 enables the key input signals from the key input signal receiving unit 92 for execution of the input processing of application software and the display processing on the display 18.

Figure 13A:
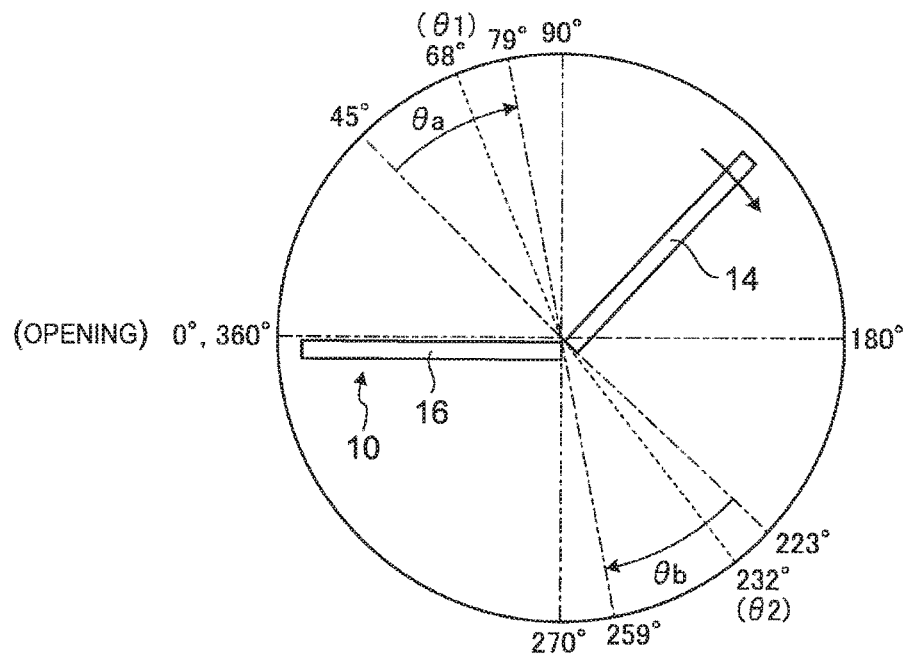
FIG. 13A schematically describes the transition of the angular positions when the display chassis is opened from the main body chassis.
Figure 13B:
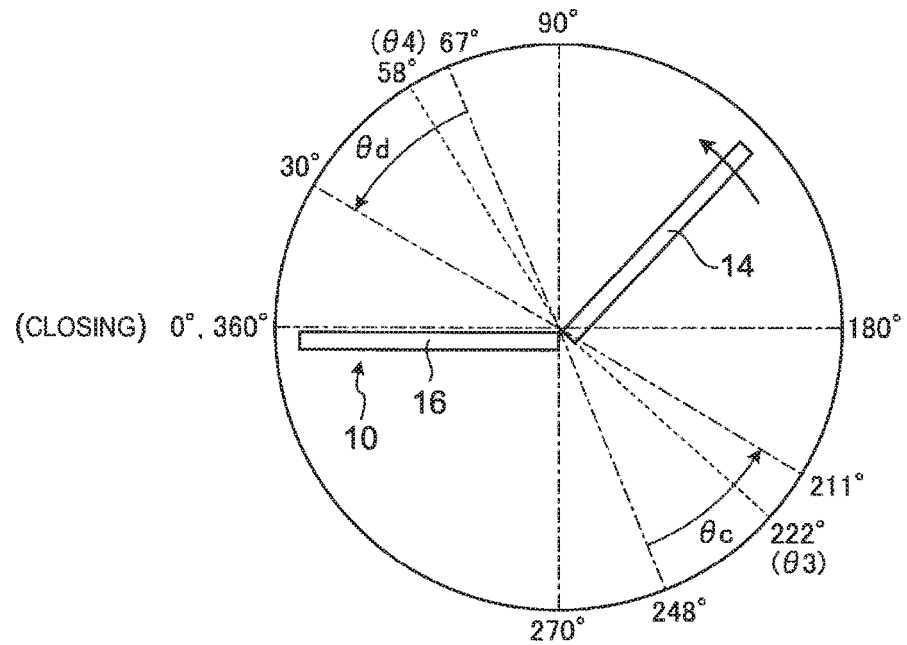
FIG. 13B schematically describes the transition of the angular positions when the display chassis is closed to the body chassis.

FIG. 13A schematically describes the transition of the angular positions when the display chassis 14 is opened from the main body chassis 16. FIG. 13B schematically describes the transition of the angular positions when the display chassis 14 is closed to the main body chassis 16.

As shown in FIG. 13A, when the display chassis 14 at the 0-degree position is opened from the main body chassis 16, the position changing mechanism part 55 of the key-position setting mechanism 26 of the electronic apparatus 10 acts in the angular range θa between the 45-degree position and the 79-degree position. Then, the keycaps 22 at the non-use position at the 0-degree position starts to move upward at the 45-degree position to be at the use position at the 79-degree position. That is, this angular range θa shows the range where the first pressure-receiving part 75b set between the 40-degree position and the 75-degree position in FIG. 10A comes slidably in contact with the first working part 70a. In this range, the front/rear slider 54 moves forward from the rearmost position to the frontmost position, whereby the pressing force on the keycap 22 by the pressing piece 52 is released, so that the keycap 22 moves upward due to the biasing force of the rubber dome 41.

Note here that in the case of the present embodiment, the angular range θa is the range between the 45-degree position and the 79-degree position, which is deviated to some extent from the range between the 40-degree position and the 75-degree position as the design angular range. Such deviation of the angular range θa results from the rattling among the elements making up the position changing mechanism part 55 and the link mechanism part 56 or their dimensional tolerance, for example. That is, if the elements making up the position changing mechanism part 55 and the link mechanism part 56 can be implemented almost free from the rattling, the angular range θa will be closer to or agree with the design angular range from the 40-degree position to the 75-degree position. The following assumes that such deviation between the design angular range and the actual angular range θa similarly occurs in the below-described angular range θb to θd as well.

Before reaching the predetermined setting angular range (first setting angular position) in the angular range θa between the 0-degree position and the 90-degree position, light between the light-emitting part 60a and the light-receiving part 60b is blocked by the detection piece 54c of the front/rear slider 54. Therefore the sensor 60 outputs an OFF signal (see FIG. 7B). The angular position determination unit 94 of the controller 90 then receives the OFF signal from the sensor 60, and the angular position determination unit 94 determines that the display chassis 14 is completely or almost closed. As a result, the key output control unit 96 disables the key input signals from the key switches 21 sent from the key input signal receiving unit 92. Therefore when the keycaps 22 are set at the non-use position by the key-position setting mechanism 26, the electronic apparatus 10 is configured to avoid an erroneous motion or an erroneous input to execute input processing of application software or display processing on the display 18 caused by the key input signal that is output based on the pressing of the keycaps 22.

At the angular position θ1 (68-degree position) that is a setting angular position set in the angular range θa, the blocking of light between the light-emitting part 60a and the light-receiving part 60b by the detection piece 54c of the front/rear slider 54 is canceled. Therefore the sensor 60 outputs an ON signal (see FIG. 7A). The angular position determination unit 94 of the controller 90 then receives the ON signal from the sensor 60, and the angular position determination unit 94 determines that the display chassis 14 is opened at a predetermined angle. As a result, the key output control unit 96 enables the key input signals from the key switches 21 sent from the key input signal receiving unit 92. Therefore at the timing a little earlier than the returning of the keycaps 22 to the use position by the key-position setting mechanism 26, the electronic apparatus 10 can be in the state enabling the execution of the input processing of application software and the display processing on the display 18 in response to the key input signals from the key switches 21. The angular position θ1 to switch the key input signals from invalid to valid may be set at the position of the keycaps 22 moving upward by about ⅓ of their stroke in the up/down motion. The angular position to output an ON signal from the sensor 60 may be set at the 79-degree position as the end point of the angular range θa. In this case, when the keycaps 22 reach the use position, the key input signals turn valid.

Next, when the display chassis 14 is further opened from the main body chassis 16, the position changing mechanism part 55 of the key-position setting mechanism 26 does not act in the angular range between the 79-degree position and the 223-degree position. This angular range shows the range where the top part 70d comes slidably in contact with the second non-working part 75c set between the 75-degree position and the 215-degree position in FIG. 10A, and so the front/rear slider 54 does not slide. Therefore, the keycaps 22 are kept at the use position in this angular range, and so the key input signals from the keycaps 22 are kept valid.

When the display chassis 14 is further opened from the main body chassis 16, the position changing mechanism part 55 of the key-position setting mechanism 26 acts in the angular range θb between the 223-degree position and the 259-degree position. Then, the keycaps 22 at the use position between the 79-degree position and the 223-degree position starts to move downward from the 223-degree position, and reaches the non-use position at the 259-degree position. That is, this angular range θb shows the range where the second working part 70b comes slidably in contact with the second pressure-receiving part 75d set between the 215-degree position and the 250-degree position in FIG. 10A. In this range, the front/rear slider 54 moves rearward from the frontmost position to the rearmost position, whereby the pressing piece 52 presses the keycap 22 down.

At this time, at the setting angular position θ2 (232-degree position) that is an angular position (second setting angular position) set in a certain angular range θb between the 180-degree position and the 360-degree position, the detection piece 54c of the front/rear slider 54 blocks the light between the light-emitting part 60a and the light-receiving part 60b, and then the sensor 60 outputs an OFF signal (see FIG. 7B). The angular position determination unit 94 of the controller 90 then receives the OFF signal from the sensor 60, and the angular position determination unit 94 determines that the display chassis 14 is opened at a predetermined angle beyond the note mode and toward the tablet mode. As a result, the key output control unit 96 disables the key input signals from the key switches 21 sent from the key input signal receiving unit 92. Therefore when the keycaps 22 move downward to the non-use position by the key-position setting mechanism 26, the electronic apparatus 10 is configured to avoid an erroneous motion or an erroneous input to execute input processing of application software or display processing on the display 18 caused by the key input signal that is output based on the down-moving of the keycaps. The angular position θ2 to switch the key input signals from invalid to valid also may be set at the position of the keycaps 22 moving upward by about ⅓ of their stroke in the up/down motion. The angular position to output an OFF signal from the sensor 60 may be set at the 223-degree position as the start point of the angular range θb. In this case, immediately after the keycaps 22 start to move downward to the non-use position, the key input signals turn invalid.

On the contrary, as shown in FIG. 13B, when the display chassis 14 at the 360-degree position is closed to the main body chassis 16, the position changing mechanism part 55 of the key-position setting mechanism 26 acts in the angular range θc between the 248-degree position and the 211-degree position. Then, the keycaps 22 at the non-use position at the 360-degree position starts to move upward from the 248-degree position to be at the use position at the 211-degree position. That is, this angular range θc shows the range where the second working part 70b comes slidably in contact with the second pressure-receiving part 75d set between the 250-degree position and the 215-degree position in FIG. 10A. In this range, the front/rear slider 54 moves forward from the rearmost position to the frontmost position, whereby the pressing force on the keycap 22 by the pressing piece 52 is released, so that the keycaps 22 moves upward due to the biasing force of the rubber dome 41.

At this time, at the angular position θ3 (222-degree position) that is a setting angular position (second setting angular position) set in a certain angular range θc between the 360-degree position and the 180-degree position, the blocking of the light between the light-emitting part 60a and the light-receiving part 60b by the detection piece 54c of the front/rear slider 54 is canceled, and then the sensor 60 outputs an ON signal (see FIG. 7B). As a result, the key output control unit 96 enables the key input signals from the key switches 21 sent from the key input signal receiving unit 92. Therefore at the timing a little earlier than the returning of the keycaps 22 to the use position by the key-position setting mechanism 26, the electronic apparatus 10 can be in the state enabling the execution of the input processing of application software and the display processing on the display 18 in response to the key input signals from the key switches 21. The angular position to output an ON signal from the sensor 60 may be set at the 211-degree position as the end point of the angular range θc. In this case, when the keycaps 22 reach the use position, the key input signals turn valid.

In the present embodiment, the angular ranges θb and θc as the acting range of the key-position setting mechanism 26 are different between the opening motion shown in FIG. 13A and the closing motion shown in FIG. 13B. Further, the angular positions θ2, θ3 that are setting angular positions to switch between valid and invalid of the key input signals in these angular ranges θb, θc are also different. These deviations in position results from the rattling among the elements making up the position changing mechanism part 55 and the link mechanism part 56 or their dimensional tolerance, for example, and the angular ranges θb, θc and the angular positions θ2, θ3 may be the same.

Next, when the display chassis 14 is further closed to the main body chassis 16, the position changing mechanism part 55 of the key-position setting mechanism 26 does not act in the angular range between the 211-degree position and the 67-degree position. This angular range shows the range where the top part 70d comes slidably in contact with the second non-working part 75c set between the 215-degree position and the 75-degree position in FIG. 10A, and so the front/rear slider 54 does not slide. Therefore, the keycaps 22 are kept at the use position in this angular range, and so the key input signals from the keycaps 22 are kept valid.

When the display chassis 14 is further closed to the main body chassis 16, the position changing mechanism part 55 of the key-position setting mechanism 26 acts in the angular range θd between the 67-degree position and the 30-degree position. Then, the keycaps 22 at the use position between the 211-degree position and the 67-degree position start to move downward from the 67-degree position, and reach the non-use position at the 30-degree position. That is, this angular range θd shows the range where the first working part 70a comes slidably in contact with the first pressure-receiving part 75b set between the 75-degree position and the 40-degree position in FIG. 10A. In this range, the front/rear slider 54 moves rearward from the frontmost position to the rearmost position, whereby the pressing piece 52 presses the keycap 22 down.

At this time, at the angular position θ4 (58-degree position) that is a setting angular position (first setting angular position) set in a certain angular range θd between the 0-degree position and the 90-degree position, the detection piece 54c of the front/rear slider 54 blocks the light between the light-emitting part 60a and the light-receiving part 60b, and then the sensor 60 outputs an OFF signal (see FIG. 7B). As a result, the key output control unit 96 disables the key input signals from the key switches 21 sent from the key input signal receiving unit 92. Therefore when the keycaps 22 move downward to the non-use position by the key-position setting mechanism 26, the electronic apparatus 10 is configured to avoid an erroneous motion or an erroneous input to execute input processing of application software or display processing on the display 18 caused by the key input signal that is output based on the down-moving of the keycaps. The angular position to output an OFF signal from the sensor 60 may be set at the 67-degree position as the start point of the angular range θd. In this case, immediately after the keycaps 22 start to move downward to the non-use position, the key input signals turn invalid.

In the present embodiment, the angular ranges θa and θd, as the acting range of the key-position setting mechanism 26, are different between the opening motion shown in FIG. 13A and the closing motion shown in FIG. 13B. Further, the angular positions θ1, θ4 that are setting angular positions to switch between valid and invalid of the key input signals in these angular ranges θa, θd are also different. Such deviation in position results from the rattling among the elements making up the position changing mechanism part 55 and the link mechanism part 56 or their dimensional tolerance, for example, and the angular ranges θa, θd and the angular positions θ1, θ4 may be the same.

Herein the angular position θ1 is the position to switch the key input signal from invalid to valid when the display chassis 14 is opened from the 0-degree position, and the angular position θ4 is the position to switch the key input signal from valid to invalid when the display chassis 14 is closed to the 0-degree position. The electronic apparatus 10 may be configured so that the angular position θ4 may be intentionally set at a smaller angle than the angular position θ1 (see FIG. 13A and FIG. 13B). That is, when the display chassis 14 is closed, the keyboard unit 20 may be used while keeping the display chassis 14 at the angular position slightly closed from the 90-degree position, for example. On the contrary, when the display chassis 14 is opened, the display chassis 14 will be opened at one time close to the 90-degree position, for example. Therefore, the keyboard unit 20 typically will not be used while keeping the display chassis 14 at the angular position slightly closed from the 90-degree position.

Then in the electronic apparatus 10, the angular position θ4 to switch the key input signal from valid to invalid during closing may be set at a smaller angular position than the angular position θ1 to switch the key input signal from invalid to valid during opening. This can prevent a problem of setting the key input signal invalid when the keyboard unit 20 is used while keeping the display chassis 14 at the angular position slightly closed from the 90-degree position, e.g., at the angular position θ1.

Such a configuration of setting different angular positions θ1, θ4 between closing and opening may be created by intentionally providing the rattling among the elements making up the position changing mechanism part 55 and the link mechanism part 56 as stated above, for example. Instead of one sensor 60, a sensor to detect the front/rear slider 54 during opening and another sensor to detect the front/rear slider 54 during closing may be provided. Then, the opening and the closing of the display chassis 14 may be determined based on the output from the acceleration sensor 98, and control may be performed based on the output from the sensor corresponding to the opening or the closing.

5. Advantageous Effects

As stated above, the electronic apparatus 10 of the present embodiment includes: the key-position setting mechanism 26 configured to interlock with rotation of the display chassis 14 and the main body chassis 16 via the hinge mechanism 12 to move the keycaps 22 from a use position (first position) to a non-use position (second position); and the controller 90 configured to enable a key input signal from the keycaps 22 when the keycaps 22 are at least at the use-position and to disable a key input signal from the keycaps 22 when the key-position setting mechanism 26 moves the keycaps 22 to the non-use position.

With this configuration, the electronic apparatus 10 can avoid an erroneous motion or an erroneous input to execute input processing of application software or display processing on the display 18 caused by the key input signal generated when the key-position setting mechanism 26 presses the keycaps 22 down to the non-use position.

In the electronic apparatus 10, the key-position setting mechanism 26 includes: the link mechanism part 56; the position changing mechanism part 55; and the sensor 60 configured to detect a predetermined state of the key-position setting mechanism 26 during movement of the keycaps 22 from the use position to the non-use position and output a result of the detection to the controller 90. Then the controller 90 switches invalid and valid of a key input signal based on a result of the detection from the sensor 60. In the above, the sensor 60 is disposed to detect a predetermined sliding position of the front/rear slider 54. Instead, the sensor 60 may detect the state of another element (the rotating shaft member 50 or the pressing piece 52) of the position changing mechanism part 55, or may detect the state of the element (left/right slider 72, the first link 78 or the second link 80) of the link mechanism part 56. With this configuration, the controller 90 switches invalid and valid of the key input signal based on the state of the predetermined element of the link mechanism part 56 and the position changing mechanism part 55 to actually move the keycaps 22 between the use position and the non-use position. Therefore, the electronic apparatus 10 can control of switching between invalid and valid of the key input signal based on the state of the operation state of the link mechanism part 56 and the position changing mechanism part 55 that actually move the keycaps 22 upward and downward. Thus, the electronic apparatus 10 can switch the key input signal between invalid and valid precisely corresponding to the actual up-down state of the keycaps 22, and so can avoid an erroneous motion and an error input more reliably.

In the present embodiment, the sensor 60 is disposed to detect the sliding position of the front/rear slider 54. With this configuration, detection can be made by the sensor 60 at a position very close to the keycaps 22 among the elements of the key-position setting mechanism 26, and so an erroneous motion and an error input can be avoided more reliably. Since the front/rear slider 54 is a member that simply slides in the front/rear direction, the detection accuracy by the sensor 60 can be achieved easily.

The controller 90 may control the switching of the key input signal between valid and invalid by the key output control unit 96 based on the output from the sensor 60 or based on the output from the acceleration sensor 98 as well as the output from the sensor 60. That is, the acceleration sensor 98 can detect the rotating state of the display chassis 14, the operating state of the key-position setting mechanism 26 corresponding to the angular position of the display chassis 14 also can be expected from the result of the detection. Then, the controller may control the switching of the key input signal between valid and invalid based on such expectation.

In the electronic apparatus 10, the sensor 60 is a non-contact type optical sensor including the light-emitting part 60*a* and the light-receiving part 60*b*. The display chassis 14 of the electronic apparatus 10 will be rotated repeatedly quite a lot of number of times during the actual use. Then, the sensor 60 that is an optical sensor of a non-contact type does not generate breakage due to the repeated sliding with the front/rear slider 54, and so the durability and the life last long. If any sensor that hardly breaks is available, the sensor 60 may be of a contact type.

The present invention is not limited to the above disclosure, and may include various changes without departing from the scope of the present invention.

For instance, the above embodiment illustrates the electronic apparatus 10 as a convertible type PC including the display chassis 14 that is rotatable from the 0-degree position to the 360-degree position. Instead, the electronic apparatus 10 may be a typical laptop PC including the display chassis 14 that is rotatable from the 0-degree position to the 180-degree position only.

We claim:

1. An electronic apparatus, comprising:
   a keyboard unit having a plurality of keycaps configured to move upward and downward between a first position wherein the keycaps move upward due to a biasing force of an elastic member and a second position wherein the keycaps move downward against the biasing force of the elastic member;
   a main body chassis in which the keyboard unit is disposed;
   a display chassis including at least a display;
   a hinge mechanism configured to rotatably join the display chassis with the main body chassis;
   a key-position setting mechanism configured to interlock with a rotation of the display chassis and the main body chassis via the hinge mechanism, and to thereby move the plurality of the keycaps from the first position to the second position; and
   a controller configured to enable a key input signal from the keycaps when the keycaps are at least at the first position and to disable a key input signal from the keycaps when the key-position setting mechanism moves the keycaps to the second position.

2. The electronic apparatus according to claim 1, wherein:
   the key-position setting mechanism comprises:
      a link mechanism part configured to interlock with a rotation of the hinge mechanism during a rotation of the display chassis relative to the main body chassis;
      a position changing mechanism part that intervenes between the link mechanism part and the keycaps, and configured to interlock with a motion of the link mechanism part to move the plurality of the keycaps upward and downward; and
      a sensor disposed at the link mechanism part or at the position changing mechanism part, the sensor being configured to detect a state of the link mechanism part or the position changing mechanism part when the key-position setting mechanism moves the keycaps from the first position to the second position, and output a result of the detection to the controller, wherein:
   the controller switches, between invalid and valid, the key input signal based on the result of the detection.

3. The electronic apparatus according to claim 2, wherein:
   the position changing mechanism part comprises:
      a slide member configured to interlock with a motion of the link mechanism part for sliding; and
      a pressing member configured to rotate when being pressed by the slide member so as to press the plurality of keycaps down to the second position against the biasing force of the elastic member and hold the keycaps, wherein:
   the sensor detects a sliding position of the slide member.

4. The electronic apparatus according to claim 2, wherein:
   the sensor is an optical sensor which is detectable without contact.

5. The electronic apparatus according to claim 1, wherein:
   the hinge mechanism rotatably joins the main body chassis and the display chassis from a 0-degree position to at least a 90-degree position wherein, at the 0-degree position, surfaces of the main body chassis and the display chassis are opposed to each other, and at the 90-degree position, the surfaces of the main body chassis and the display chassis are orthogonal to each other,
   at least at the 90-degree position, the plurality of the keycaps are at the first position, and at least at the 0-degree position, the plurality of the keycaps are held at the second position by the key-position setting mechanism, and the controller switches, between invalid and valid, the key input signal at a setting angular position between the 0-degree position and the 90-degree position.

6. The electronic apparatus according to claim 5, wherein:
the setting angular position, when the display chassis is opened from the 0-degree position to the 90-degree position, is defined as a first angular position; the setting angular position, when the display chassis is closed from the 90-degree position to the 0-degree position, is defined as a second angular position; and the second angular position is a smaller angle than at the first angular position.

7. The electronic apparatus according to claim 1, wherein:
the hinge mechanism rotatably joins the main body chassis and the display chassis from a 0-degree position to a 360-degree position via a 180-degree position wherein, at the 0-degree position, surfaces of the body chassis and the display chassis are opposed to each other, at the 180-degree position, the surfaces of the body chassis and the display chassis are directed to a same direction and are parallel to each other, and at the 360-degree position, rear faces of the main body chassis and the display chassis are opposed to each other, at least in a range from the 90-degree position to the 180-degree position, the plurality of keycaps are at the first position, and at least at the 0-degree position and at the 360-degree position, the plurality of the keycaps are held at the second position by the key-position setting mechanism, and the controller switches, between invalid and valid the key input signal at a first setting angular position between the 0-degree position and the 180-degree position, and at a second setting angular position between the 180-degree position and the 360-degree position.

8. The electronic apparatus according to claim 7, wherein:
the first setting angular position, when the display chassis is opened from the 0-degree position to the 180-degree position, is defined as a first angular position; the first setting angular position, when the display chassis is closed from the 180-degree position to the 0-degree position, is defined as a second angular position; and the second angular position is a smaller angle than at the first angular position.

* * * * *